(12) United States Patent
Vitsnudel

(10) Patent No.: US 8,749,607 B2
(45) Date of Patent: Jun. 10, 2014

(54) FACE EQUALIZATION IN VIDEO CONFERENCING

(75) Inventor: Ilia Vitsnudel, Even Yehoda (IL)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/397,240

(22) Filed: Feb. 15, 2012

(65) Prior Publication Data

US 2013/0100235 A1    Apr. 25, 2013

Related U.S. Application Data

(60) Provisional application No. 61/549,495, filed on Oct. 20, 2011.

(51) Int. Cl.
*H04N 7/14* (2006.01)
*H04N 7/15* (2006.01)

(52) U.S. Cl.
USPC .................................. 348/14.01; 348/14.08

(58) Field of Classification Search
USPC ................................. 348/14.09, 14.08, 14.01
See application file for complete search history.

(56) References Cited

U.S. PATENT DOCUMENTS

2008/0218585 A1* 9/2008 Wagner ...................... 348/14.09
2012/0093365 A1* 4/2012 Aragane et al. ............... 382/103

* cited by examiner

*Primary Examiner* — Stella Woo

(57) ABSTRACT

A video conferencing device, which includes a processor, a memory, and a interface configured to receive a video stream having a plurality of objects. The video conferencing device also includes an object selector configured to select a region surrounding a first object in the plurality of objects in the video stream, wherein the first object has abnormal characteristics when compared to a second object, a transformation generator configure to create a transformation, and a transformation module configured to apply the transformation to the video stream to create a transformed video stream, in which the first object appears in a manner more consistent with the second object.

20 Claims, 5 Drawing Sheets

200

Frame 102

Transform

Frame 102.1

FACE EQUALIZATION IN VIDEO CONFERENCING

CROSS-REFERENCE TO RELATED APPLICATIONS

The present invention claims the benefit of U.S. Provisional Application No. 61/549,495, filed Oct. 20, 2011, which is incorporated herein by reference in its entirety.

BACKGROUND OF THE INVENTION

1. Field of the Invention

The invention relates generally to the field of video conferencing.

2. Related Art

In a video conference, it is often typical that one camera is focused on multiple users sitting at different distances from a camera. For example, two users may be using a laptop web camera to perform a video conference. In such a case, since physical space is limited in front of the laptop, one user may be located behind the other user. However, depending on the particular camera and each of the users' particular geometry, optical distortions may cause one user to appear significantly larger than the other in the video stream, even though their distance from each other and from the camera may be marginal. In particular, this may occur when the users are seated close to the camera. Moreover, the physical space where the users are located may have a variety of light sources positioned at different places. Accordingly, in some cases, one user may have more light focused on him or her than the other user. In such a case, the user with more light may appear brighter in the video stream. What is needed therefore is an improved methods and devices for video conferencing.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
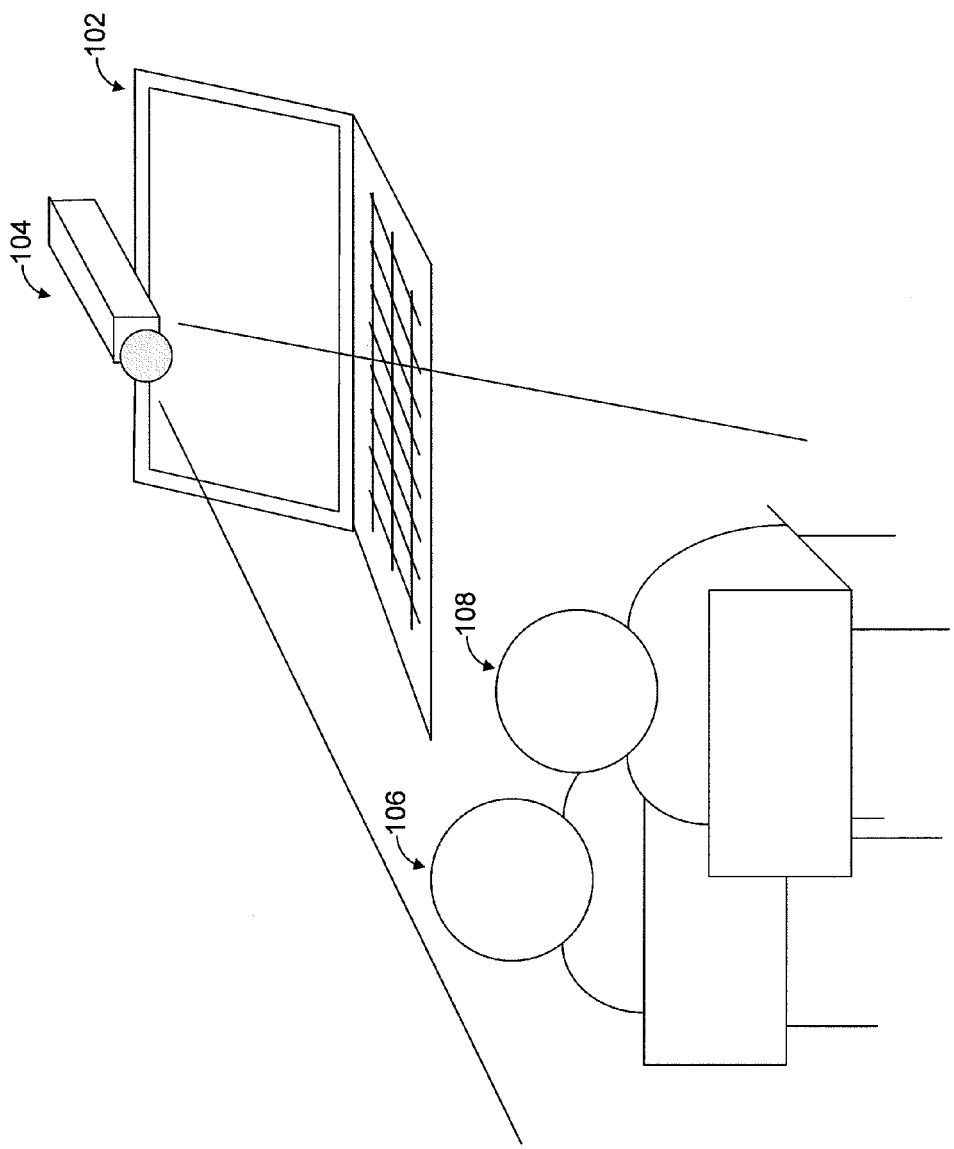
FIG. 1 is a diagram of a video conferencing environment, according to an exemplary embodiment.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

An Exemplary Video Conferencing Environment

FIG. 1 is a diagram of a video conferencing environment 100, according to an exemplary embodiment. Video conferencing environment 100 provides for communication between user 106, user 108, and one or more remote users. In particular, video conferencing environment 100 may provide for real time video and/or audio communication between users 106 and 108 and one or more remote users (not shown).

Although FIG. 1 depicts two users, a person of skill in the art would recognize that the video conferencing environment 100 may include more than two users located at video conferencing device 102.

Camera 104 is responsible for capturing the real time video of user 106 and user 108. Camera 104 may be any type of camera capable of communicating with a computing device. Camera 104 may also be an external device attached to video conferencing device 102 or integrated inside of video conferencing device 102. For example, camera 104 may be a built-in web camera in a laptop computer. Camera 104 may also include an integrated microphone or the microphone may be connected externally to video conferencing device 102.

Video conferencing device 102 provides for processing of a video stream from camera 104 and the transmittal of the video stream to one or more remote clients as well as the reception of a video stream from remote clients. Video conferencing device 102 may be any type of device capable of performing a video conference. For example, video conferencing device 102 may be a personal computer, laptop, server, tablet, mobile device, dedicated video-conferencing hardware, digital camera, or other device capable of receiving or transmitting images or video.

In an exemplary embodiment, camera 104 is pointed at both users 106 and 108 such that both users appear within the frame of the video stream. However, in some cases user 106 and user 108 may appear to have abnormal characteristics due to a various distortions. For example, user 108 may be positioned to the right and slightly behind user 106. In such a case, user's 108 face may appear to have abnormal characteristics in comparison to user 106. In particular, user's 108 face may appear abnormally large because of perspective distortion. Perspective distortion may occur under a variety of circumstances. For example, often when filming objects, and in particular filming objects close to a camera, an object further away from the camera may appear abnormally small while an object closer may appear abnormally large even though both objects may be relatively close together. Thus, in the case of users 106 and 108, user 106 may appear abnormally large while user 108 may appear abnormally small.

Lighting variations may also cause abnormal characteristics between users 106 and 108. For example, the physical space where users 106 and 108 are located may have a variety of different light sources at a variety of angles. In such a case, user 106 may have more light focused on him or her, than user 108, or vice versa. Accordingly, user 106 may appear abnormally brighter in the video stream than user 108. In an exemplary embodiment, video conferencing device 102 may contain software and hardware that is configured to correct such distortions using transformations.

An Exemplary Video Frame Transformation

Figure 2:
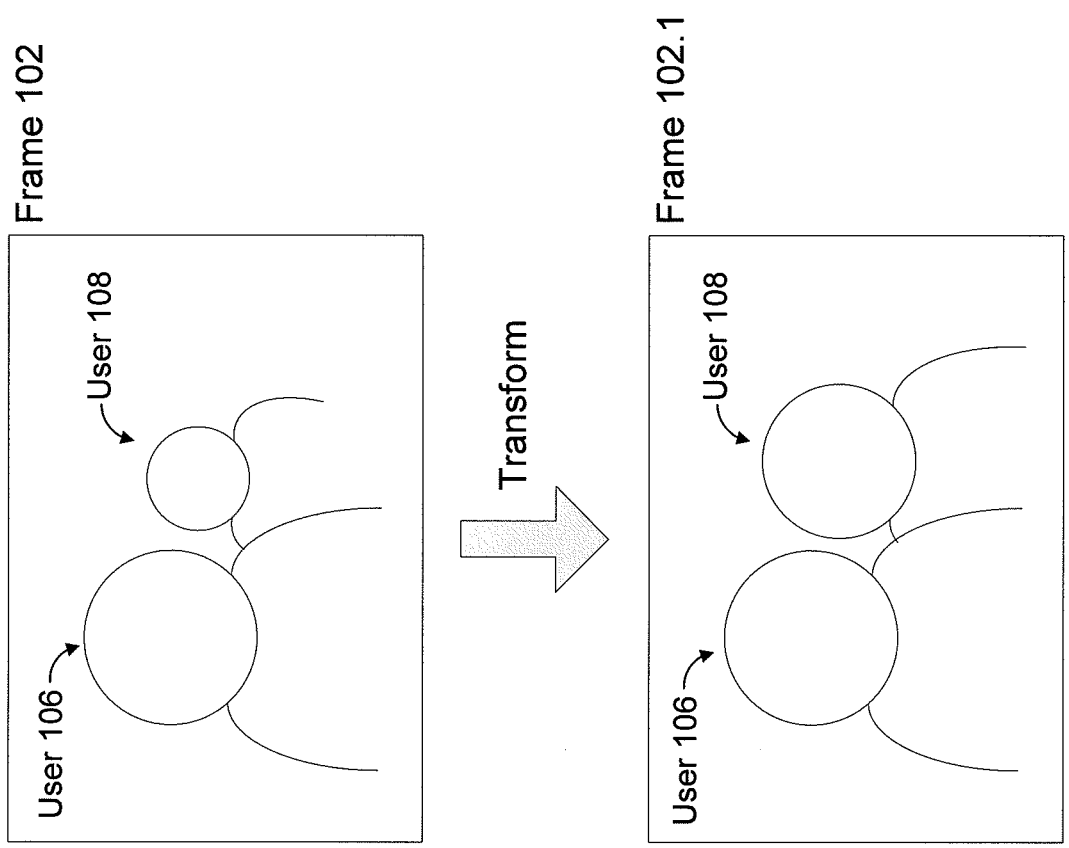
FIG. 2 is a diagram of a video frame before and after a perspective distortion transformation, according to an exemplary embodiment.

FIG. 2 is a diagram of a video frame before and after a perspective distortion transformation, according to an exemplary embodiment.

Frame 102 includes user 106 and user 108. Similarly, to FIG. 1, user 108 is positioned slightly behind user 106. Accordingly, user's 108 face may suffer from perspective distortion. In particular, user's 108 face may appear abnormally small when compared to user's 106 face. In an exemplary embodiment, user's 108 face may be corrected using a transformation. For example, a fish eye transformation may be applied to user's 108 face in order to correct the perspective distortion. A fish eye transformation, when applied to an image, may cause the image to be more enlarged at the center of the part of the image where transformation is applied, and then gradually less enlarged as the transformation moves away from that center point. Thus, as a result of the transformation, the face of user 108 may be enlarged. While reference is made to users 106 and 108, frame 102 may include more than two users and any combination of the users may suffer from one or more optical distortions.

Frame 102.1 depicts user 106 and user 108 after the transformation has been applied. In particular frame 102.1 depicts user 108 after a fish eye transformation has been applied to user's 108 face. As a result of the transformation, user's 108 face has been enlarged such that it is more consistent with user's 106 face.

An Exemplary Video Conferencing Device

Figure 3:
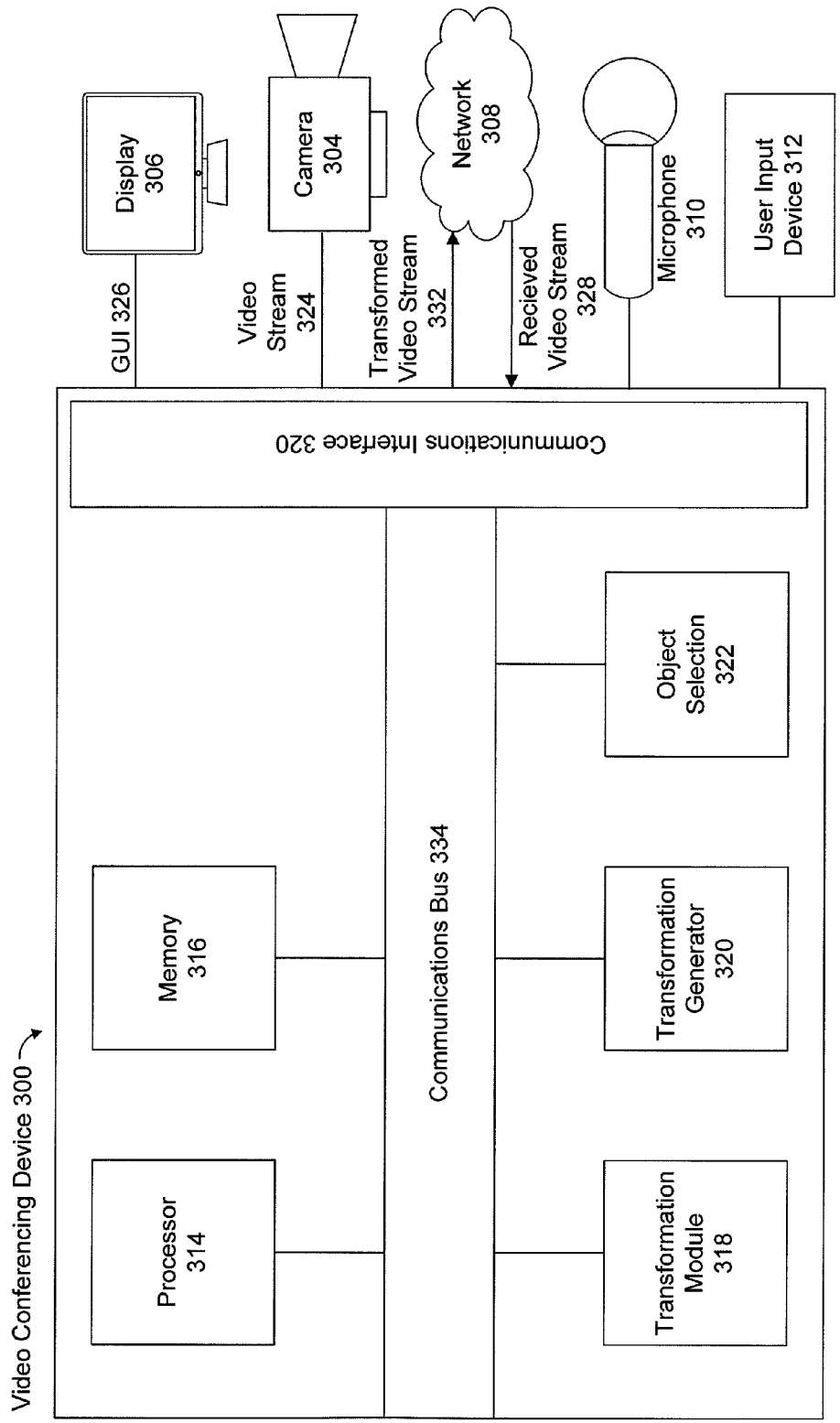
FIG. 3 is a block diagram of an exemplary video conferencing device for correcting abnormal characteristics in a video conference, according to an exemplary embodiment.

FIG. 3 is a block diagram of an exemplary video conferencing device 300 for correcting abnormal characteristics in a video conference, according to an exemplary embodiment. Video conferencing device 300 may be implemented as a standalone device, or components of video conferencing device 300 may be implemented in other devices. Video conferencing device 300 may be a dedicated video conferencing device or a general computing device, including but not limited to, a personal computer, laptop, tablet, server, mobile device, or other device capable of receiving or transmitting video or images. Video conferencing device 300 may also be a digital camera capable of taking still shots or recording video, including but not limited to a point-and-shoot camera, a bridge camera, a digital single-lens reflex camera (DSLR), or a mobile phone with integrated digital camera.

Video conferencing device 300 includes a processor 314 and a memory 316. Processor 314 may be configured to execute instructions stored on memory 316. Processor 314 may be a general purpose processor or a special purpose processor. Memory 316 may be any type of persistent or non-persistent computer readable storage medium including but not limited to, RAM, ROM, EPROM, EEPROM, flash memory, a magnetic storage medium, or an optical storage medium. Processor 314 may communicate with memory 316 over communications bus 334. Communications bus 334 may allow for both parallel and serial connections between devices and modules connected to communications bus 334. Processor 314 may also communicate with transformation module 318, transformation generator 320, and object selector 322 using communications bus 334. Transformation module 318, transformation generator 320, and object selector 322 may each be implemented in hardware, software or a combination of both. If implemented in software, each of the transformation module 318, transformation generator 320, and object selector 322 may comprise instructions stored on memory 316. Accordingly, each of the transformation module 318, transformation generator 320, and object selector 322 may perform their own native processing or communicate instructions to processor 314.

Video conferencing device 300 may include a communications interface 330 that allows software and data to be transferred between video conferencing device 300 and external devices or separate integrated devices. In particular, a camera 304, a display 306, a network 308, a microphone 310, and a user input device 312 may be connected to communications interface 330. Communications interface 330 may include a modem, a network interface (such as an Ethernet card), a communications port, a PCMCIA slot and card, or the like. Software and data transferred via communications interface 330 may be in the form of signals, which may be electronic, electromagnetic, optical, or other signals capable of being received by communications interface 330.

Video conferencing device 300 may receive data from camera 304 through communications interface 330. In particular, video conferencing device 300 may receive live video in the form of a video stream 324 from camera 304. In an exemplary embodiment, camera 304 may include one or more cameras. Video stream 324 may be in any format suitable for encapsulating live video, including but not limited to, MPEG, H.264, or H.264+. Camera 304 may also be any type of camera capable of interfacing with video conferencing device 300. For example, camera 304 may be a CMOS-based camera or a CCD-based camera. Camera 304 may also include an analog-to-digital converter to convert analog signals into digital signals, which may be provided to video conferencing device 300. Camera 304 may also be integrated with video conferencing device 300. For example, video conferencing device 300 may be a laptop and camera 304 may be an integrated web camera in the laptop. Camera 304 may also be an external device connected to video conferencing device 300. For example, camera 304 may use USB, Firewire, Serial, Ethernet, or any other connection type to connect to video conferencing device 300. Aspects of camera 304 may also be configurable by a user of video conferencing device 300. Camera 304 may be controlled by a user of video conferencing device 300 to pan left and right, tilt up or down, and zoom. Camera 304 may also be controlled automatically, by video conferencing device 300, to pan left and right, tilt up or down, and zoom. In particular, camera 304 may automatically pan, tilt, and/or zoom automatically towards a user when that user is speaking.

Video stream 324 may comprise a plurality of video frames depicting one or more objects recorded by camera 304. More specifically, some of the one or more objects may have abnormal characteristics. For example, video stream 324 may depict a person's face that appears unnaturally large due to perspective distortion or a person's face that appears unnaturally bright due to unequal lighting.

Video conferencing device 300 may also receive data from microphone 310 through communications interface 330. Microphone 310 may be any type of device capable of converting detected sound into electrical signals and transmitting those signals to video conferencing device 300. Microphone 310 may be integrated in video conferencing device 300 or camera 304. Microphone 310 may also connect externally to video conferencing device 300. For example, microphone 310 may use USB, an XLR connector, a ¼" connector, a 3.5 mm, or any other suitable connection type to connect to video conferencing device 300. Microphone 310 may also be unidirectional, omnidirectional, bidirectional, cardoid, or any other type of microphone. In an exemplary embodiment, video conferencing device 300 may receive data from more than one microphone. For example, in one case, microphone 310 may be configured with multiple microphones angled in different directions. In another case, microphone 310 may include multiple microphones placed throughout a physical space, such as a room.

Video conferencing device 300 is also connected to a network 308 through communications interface 330. Network 308 may be any type of computing network capable of transmitting data between devices, such as a wide-area network, a local area network, or a combination of both. For example, network 308 may be the Internet. Video conferencing device 300 may be configured to communicate with other video conferencing devices using any communication protocol suitable for video conferencing communications. For example, video conferencing device 300 may communicate using the Real-time Transport Protocol (RTP) standardized packet format, in conjunction with the RTP Control Protocol. The RTP standardized packet format is defined by RFC 3550. Accordingly, video conferencing device 300 may be configured to receive a remote video stream 328 from a remote video conferencing device over network 308. Likewise, video conferencing device 300 may also be configured to transmit transformed video stream 332 to a remote video conferencing device over network 308.

Video conferencing device 300 may also display a graphical user interface (GUI) 326 on a display 306. GUI 326 may provide for a variety of settings and controls that allow for a user to initiate, control, and perform a video conference. For example, GUI 326 may display video stream 324. The GUI may also display video received from remote users, such as remote video stream 328. Display 306 may be a variety of different displays, including but not limited to, a television, computer monitor, projector, or other device capable of displaying signals. Display 306 may be integrated with video conferencing device 300. For example, video conferencing device 300 may be a laptop, and display 306 may be a laptop screen. Display 306 may also be connected externally to video conferencing device 300. For example, display 306 may use HDMI, DisplayPort, composite video, component video, S-Video, DVI, or VGA, or any other suitable connection type to connect to video conferencing device 300.

Video conferencing device 300 includes an object selector 322. Object selector 322 may be configured to select one or more objects within video stream 324 with abnormal characteristics. In particular, object selector 322 may be able to determine the regions within video stream 324 of one or more objects with abnormal characteristics. For example, object selector 322 may select a face that appears unnaturally large or a face that appears unnaturally bright. According to an exemplary embodiment, object selector 322 may receive input from user input device 312 in order to select an object. User input device 312 may be one or more devices capable of receiving input from a user, such as any combination of a keyboard, mouse, touchpad, touchscreen, etc. In particular, a user may use user input device 312 to define the boundaries of an object with abnormal characteristics. For example, GUI 326 may be configured to allow the user to draw a box around an object that has unequal characteristics. GUI 326 may also allow the user to select from a variety of shapes to more closely define the region surrounding the object with unequal characteristics. For example, a user may draw an ellipse to define the boundaries for a person's face. Object selector 322 may then receive these boundaries and use them to define a region surrounding the object with abnormal characteristics. While reference is made to object selector 322 operating on video stream 324, in an exemplary embodiment, object selector 322 may instead operate on remote video stream 328, or may be configured to operate on both video stream 324 and remote video stream 328.

In an exemplary embodiment, object selector 322 may also automate the detection of objects within video stream 324. In particular, object selector 322 may locate the boundaries of each of the objects within video stream 324. There are a variety of techniques object selector 322 may use to detect objects within video stream 324, including but not limited to, edge detection, greyscale matching, gradient matching, interpretation trees, face detection, and facial recognition. For example, face detection techniques may analyze objects currently present in a video stream or picture, and determine whether any of the objects represent a person's face. Face detection techniques, may include, but are not limited to, color segmentation, image segmentation, multi-fractal analysis, Haar Classifiers, or the Viola-Jones algorithm. Facial recognition techniques may include, but are not limited to, Principal Component Analysis, Independent Component Analysis, eigenface, Linear Discriminate Analysis, Elastic Bunch Graph Matching, Trace Transform, Active Appearance Model, a Hidden Markov Model, line edge matching, Support Vector Machine, dynamic link matching, and three-dimensional facial recognition.

Once the objects have been located within video stream 324, for example using facial recognition, object selector 322 may also be configured to determine automatically whether any of the objects include abnormal characteristics, according to an exemplary embodiment. In the case of perspective distortion, this may be accomplished by measuring the distance between two shared characteristics of the multiple objects when multiple objects exist in video stream 324. For example, in the case of a face, object selector 322 may be configured to measure the distance between particular facial characteristics, such as a face's eyes. If the eyes on one face are significantly closer or farther apart than eyes on a different face in video stream 324, and outside of a particular threshold, then that face may have perspective distortion. For example, object selector 322 may determine a face has perspective distortion if the eyes are 20% or more closer when compared to a different face.

Another abnormality that may manifest itself within video stream 324 is luminescence distortion. In such a case, object selector 322 may compare the brightness between the two objects. Accordingly, if one object is brighter by a particular threshold than another object, that object may be considered abnormally bright by object selector 322.

In an exemplary embodiment, object selector 322 may also be preconfigured with expected values. Thus, object selector 322 may not need to compare one object to another and instead may compare an object to the preconfigured expected values. For example, in the case of a face, instead of comparing one detected face to another detected face, object selector 322 may compare one face to the preconfigured expected values. Accordingly, if the face's eyes are certain number of pixels apart, object selector 322 may determine the face has perspective distortion. Similarly, if an object has a particular brightness above a certain value, object selector 322 may determine the object is abnormally bright.

In an exemplary embodiment, object selector 322 may also be configured with a hybrid approach to detect objects and abnormal characteristics. Object selector 322 may be configured to automatically detect objects with abnormal characteristics and then cause a dialog to be presented to the user in GUI 326 that informs the user that one or more objects within video stream 324 have abnormal characteristics. The dialog may further depict the one or more objects and provide suggested transformations. The dialog may also be further configured to provide a preview of each object after the transformation has been applied, such that the user can decide whether to apply the transformation.

In an exemplary embodiment, object selector 322 may also assist the user in inputting the boundaries to a particular object. In particular, the user may select an object using user input device 312 by clicking in the general area of the object. Object selector 322 may then automatically determine the boundaries of the object that corresponds to the selected area using the object detection techniques described herein. The user may then be permitted to further adjust the detected boundaries.

Video conferencing device 300 also includes a transformation generator 320 and a transformation module 318. Although described herein as separate modules, a person of skill in the art would recognize that transformation generator 320 and transformation module 318 may be implemented in one module. Transformation generator 320 may be configured to determine the appropriate transformation for an object based upon the particular abnormal characteristic. Transformation generator 320 may determine the appropriate transformation automatically, by receiving user input, or a combination of both. In particular, object selector 322 may have already determined that a particular object has an abnormal characteristic. Accordingly, transformation generator 320 may then receive as an input from object selector 322 the type of abnormality and the boundaries of the object displaying the abnormality. For example, object selector 322 may have determined that a particular object exhibits perspective distortion. In such a case, transformation generator 320 may receive as an input the boundaries of the particular object and perspective distortion that was detected within that object. While reference is made to transformation generator 320 operating on video stream 324, in an exemplary embodiment, transformation generator 320 may instead operate on remote video stream 328, or may be configured to operate on both video stream 324 and remote video stream 328.

Transformation generator 320 may also determine the appropriate transformation based upon input from user input device 312. In particular, a user may have inputted the boundary of an object having an abnormal characteristic. The boundary inputted by the user may then be received as input by the transformation generator 320. Transformation generator 320 may then cause GUI 326 to present to the user a display that asks the user which type of transformation should be applied. The user may then select from a plurality of transformations, the appropriate transformation. In an exemplary embodiment, the dialog may also provide suggested transformations based upon a detected abnormality. In particular, transformation generator 320 may use abnormality detection techniques discussed herein to identify the abnormality for the object selected by the user. The dialog may also be further configured to provide a preview of each object after the transformation has been applied.

Transformation generator 320 may be configured to generate a variety of transformations, including but not limited to, a fish eye transformation, a luminescence transformation, and a scaling transformation. The particular transformation that transformation generator 320 may create, depends on the particular abnormality occurring in an object. For example, in the case of perspective distortion, transformation generator 320 may create a fish eye transformation for the affected object. A fish eye transformation, when applied to an image, may cause the image to be more enlarged at the center of the part of the image where transformation is applied, and then gradually less enlarged as the transformation moves away from that center point. Transformation generator 320 may create a variety of fish eye transformations, including but not limited to: linear scaled, orthographic, equisolid angle, and stereographic. In the case of abnormal brightness, transformation generator 320 may create a luminescence transformation. A luminescence transformation, when applied to an image, may adjust the brightness of the image. A person of skill in the art, would recognize that the methods, devices, and systems disclosed herein may be extended to any type of abnormality that may manifest itself in a video stream.

Transformation generator 320 may be configured to generate a data representation of the selected transformation in the form of a matrix or a function. The transformation generator 320 may also limit the generated matrix or function to a particular region, such as the boundary of an object. Accordingly, while the matrix or function may be applied to an entire frame of video stream 324, the transformation may only occur within a particular part of the frame, such as within the boundary of an object. In an exemplary embodiment, camera 304 may be a plurality of cameras. In such a case, depth information, such as a depth mask may be calculated. The depth mask may then be further sent to the transformation generator 320 to assist in generating the transformation.

Transformation module 318 may be configured to apply the transformation generated from transformation generator 320 to the video stream 324 to create transformed video stream 332. However, as discussed previously, the transformation may also be applied to remote video stream 328, thereby enabling a receiving user to transform the incoming video stream instead of the originating user transforming the outgoing stream. The transformation may then be applied on a frame by frame basis within video stream 324 or remote video stream 328. While reference is made to transformation module 318 operating on video stream 324, in an exemplary embodiment, transformation module 318 may instead operate on remote video stream 328, or may be configured to operate on both video stream 324 and remote video stream 328.

In some cases, the abnormal object may remain in a relatively static position throughout the video conference, thus the transformation may remain effective throughout the video conference and may be applied statically to video stream 324. However, in other cases, the abnormal object may be moving or even slightly moving, thereby causing a transformation applied statically to not remain effective throughout the video conference call. In an exemplary embodiment, the user when selecting the boundaries of the abnormal object, may account for this by making the boundaries large enough to account for movements of the particular object. This may permit the transformation to still be applied statically.

In an exemplary embodiment, transformation module 318 may be configured to automatically track the abnormal object and automatically adjust the location where the transformation is being applied based upon the movements of the abnormal object. In particular, transformation module 318 may use the object detection techniques describe with reference to object selector 322 to track the borders of the abnormal object in real time. Accordingly, transformation module 318 may then adjust the transformation, such that it is applied with reference to the borders obtained by the automatic object tracking. This may then permit transformation module 318 to apply the transformation from transformation generator 320 dynamically by adjusting the borders of the abnormal object as the abnormal object moves.

In an exemplary embodiment, transformation module 318 may also be configured to save a transformation for each user. In particular, as discussed above, camera 304 may be configured to automatically pan, tilt, and/or zoom towards a user when the user is speaking. Accordingly, the objects appearing in the video stream 324 may change based upon which user is speaking. For example, camera 304 may focus in on only one user when that user is speaking, so that only that user may appear in video stream 324. Camera 304 may also focus in on a group of users when one of the users in the group is speaking. In an exemplary embodiment, a transformation may be created for each user or a group of users. Accordingly, when camera 304 focuses in on a user or a particular group of users (e.g. because a user is speaking), the corresponding transformation may be applied by transformation module 318.

While FIG. 3 is described with reference to a video conferencing device 300. A person of skill in the art would be able to adapt the apparatuses, methods, and systems disclosed herein to work with other devices. For example, in an exemplary embodiment, the techniques described herein may be implemented in a standalone digital camera or digital video camera, including but not limited to, point-and-shoot, DSLR camera, or a mobile phone with built-in digital camera. In such a case, the digital camera may take still images or video recordings that contain objects exhibiting optical distortions. These optical distortions may then be adjusted automatically or with user input within the digital camera device itself, or within software running on a computing device configured to receive images from the camera device.

An Exemplary Video Conferencing System

Figure 4:
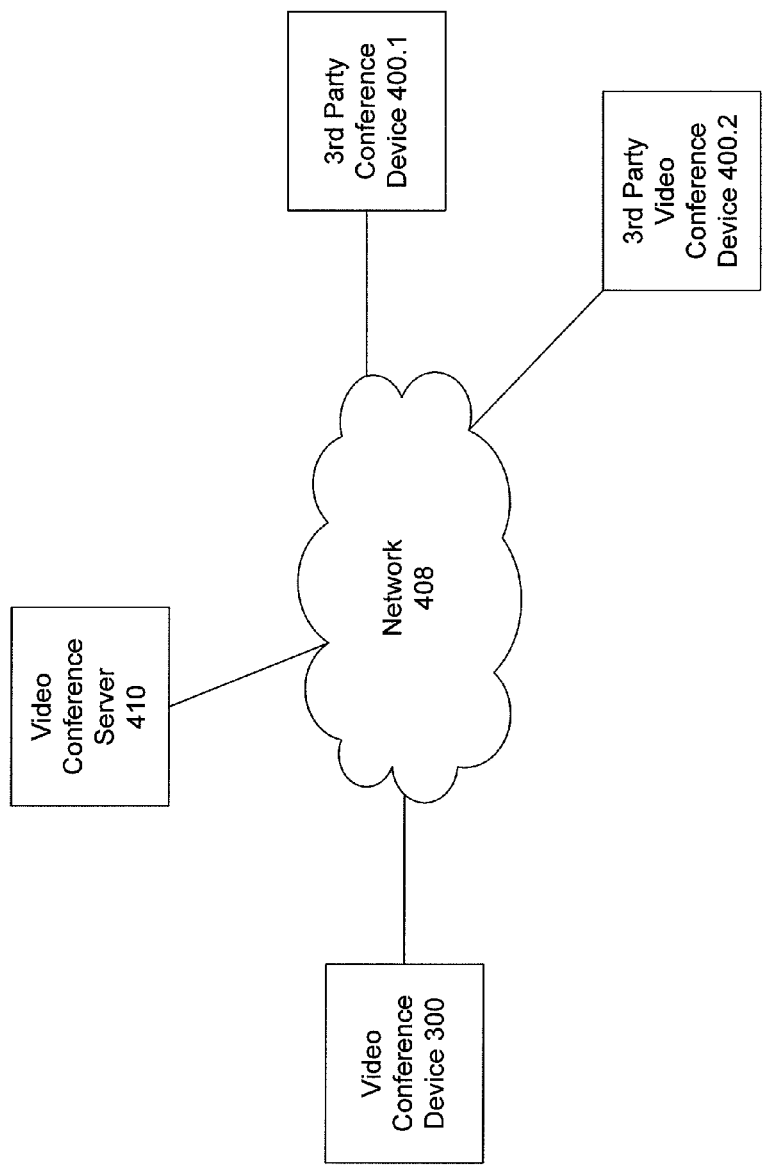
FIG. 4 is a diagram of an environment in which embodiments may be implemented.

FIG. 4 is a diagram of an environment 400 in which embodiments may be implemented. Environment 400 includes a video conferencing device 300 as described herein. Video conferencing device 300 is connected to network 408. Environment 400 also includes third party video conferencing devices 400.1 and 400.2. Third party video conferencing devices 400.1 and 400.2 may use a video conferencing device such as video conferencing device 300, or may use a standards-compliant video conferencing device that can communicate with video conferencing device 300.

Video conferencing device 300 may communicate with third party video conferencing devices 400.1 and 400.2 using any communication protocol suitable for video conferencing communications over network 408. For example, video conferencing device 300 may communicate with third party video conferencing devices 400.1 and 400.2 using the Real-time Transport Protocol (RTP) standardized packet format, in conjunction with the RTP Control Protocol. The RTP standardized packet format is defined by RFC 3550.

In an exemplary embodiment, third party video conferencing devices 400.1 and 400.2 may be configured to only support one-way communication. In such a case, third party video conferencing device 400.1 and 400.2 may not include a microphone or camera. In an exemplary embodiment, third party video conferencing devices 400.1 and 400.2 may also be configured to only transmit audio instead of both audio and video. Accordingly, third party video conferencing devices 400.1 and 400.2 may receive video from video conferencing device 300, but may only transmit audio in return to video conferencing device 300.

In an exemplary embodiment, video conferencing device 300 may only support one-way communication. In such a case, video conferencing device 300 may not include a camera or a microphone, for example camera 304 or microphone 310. Accordingly, in order to correct for object abnormalities, video conferencing device 300 may be configured to apply transformations to the received video stream (e.g. remote video stream 328) instead of the transmitted video stream (e.g. video stream 324).

In an exemplary embodiment, environment 400 may also include video conferencing server 410. Video conferencing server 410 may be configured to coordinate video conferencing sessions between and among one or more of third party video conferencing participants 400.1 and 400.2 and video conferencing device 300. In an exemplary embodiment, environment 400 may not include a video conferencing server 410. In such a case, video conferencing device 300 may connect directly to third party conference devices 400.1 and 400.2.

Figure 5:
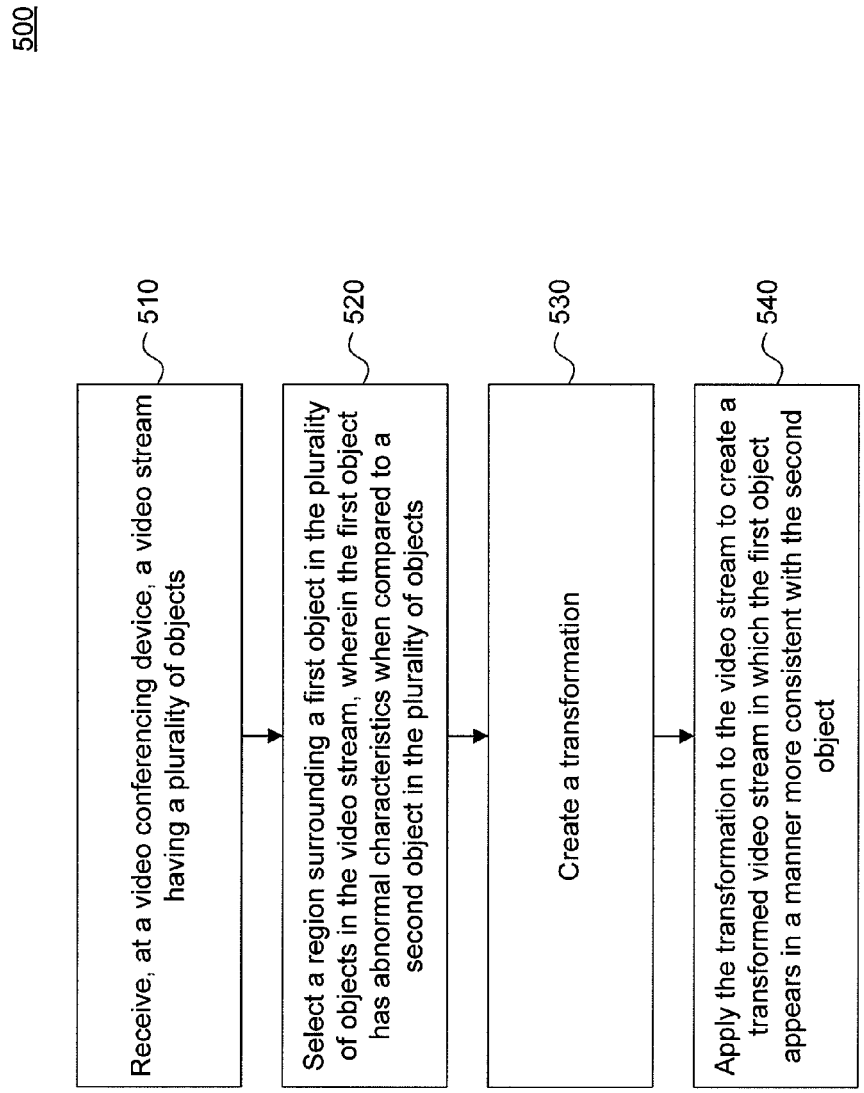
FIG. 5 is flow diagram of a method for correcting abnormal characteristics in a video conference, according to an exemplary embodiment.

An Exemplary Method for Correcting Abnormal Characteristics in a Video Conference FIG. 5 is flow diagram of a method for correcting abnormal characteristics in a video conference, according to an exemplary embodiment.

At block 510 of method 500, a video stream is received having a plurality of objects from a camera. The video stream may be from a camera, such as camera 304 of FIG. 3. The video stream may also be from a camera of a remote client, for example third party conference device 400.1 of FIG. 4. For example, the video conference may be a one-way conference in which only one of the clients receives a video stream. In such a case, the abnormal characteristics may be corrected on the received video stream from the remote device.

At block 520, a region surrounding an object from the plurality of objects in the video stream, is selected. The object with the selected region may have abnormal characteristics when compared to the remaining plurality of objects. For example, the object may exhibit perspective distortion or luminescence distortion. The region surrounding the object may be selected in a number of ways. For example, a user may select the region through the use of an input device, for example user input device 312 of FIG. 3. The user may select the region by selecting the boundaries using predefined shapes. For example, the user may draw a box around the region with the affected object, or the user may use a variety of other shapes, including but not limited to, polygons, and ellipses.

In an exemplary embodiment, the plurality of objects may be detected automatically by an object selector, for example object selector 322 of FIG. 3. In particular, the affected object may be detected using techniques including but not limited to, edge detection, greyscale matching, gradient matching, interpretation trees, face detection, and facial recognition. For example, face detection techniques may analyze objects currently present in a video stream or picture, and determine whether any of the objects represent a person's face. Face detection techniques, may include, but are not limited to, color segmentation, image segmentation, multi-fractal analysis, Haar Classifiers, or the Viola-Jones algorithm. Facial recognition techniques may include, but are not limited to, Principal Component Analysis, Independent Component Analysis, eigenface, Linear Discriminate Analysis, Elastic Bunch Graph Matching, Trace Transform, Active Appearance Model, a Hidden Markov Model, line edge matching, Support Vector Machine, dynamic link matching, and three-dimensional facial recognition.

Once the objects are detected the regions surrounding them may be identified. In an exemplary embodiment, the region surrounding each of the plurality of objects is the boundary of each of the objects themselves. However, in an exemplary embodiment the region selected may be a predetermined number of pixels larger or smaller than each of the plurality of object's borders, depending on the particular transformation selected. This may then allow for blending to occur when a transformation is applied.

Once the objects are identified, they may be further analyzed to determine if any of the objects in the plurality of objects have abnormal characteristics. For example, in the case of a face, the distance between particular facial characteristics may be measured, such as the face's eyes. If one face's eyes are significantly closer or farther apart than a different face's eyes within the video stream, and outside of a particular threshold, then that face may have perspective distortion. For example, a face may be considered to exhibit perspective distortion if a face's eyes are 20% or more closer when compared to a different face. Another abnormality that may manifest itself within a video stream is luminescence distortion. In such a case, the brightness may be compared between objects. Accordingly, if one object is brighter by a particular threshold than another object, that object may be considered to exhibit luminescence distortion.

Abnormal characteristics may also be determined by comparing an object's characteristics to predefined expected values. For example, the distance between the eyes on face may be compared to an expected value, such as a certain number of pixels. If the eyes are further away or closer, within a threshold, than those certain number of pixels, the object may be considered abnormal. Similarly, with luminescence distortion, the brightness of an object may be compared to a predefined expected value. If the brightness is higher or lower, within a threshold, than the object may be considered abnormal.

Once an abnormal object has been identified, in an exemplary embodiment, a suggestion may be made to a user in a graphical user interface, for example GUI 326 of FIG. 3 to correct the abnormality in that object. The suggestion may also include a preview of the object after the abnormality has been corrected. In the case where a user desires to define the boundaries of an object that contains the abnormality, the object detection mechanism may also assist the user by suggesting a particular region. The user may then further adjust the suggested region. However, abnormalities may also be automatically corrected without any user interaction, according to an exemplary embodiment.

At block 530, a transformation is created, wherein the transformation, when applied to the region, permits the object to appear in a manner more consistent with the remaining plurality of objects. The transformation may be created by a transformation generator, such as transformation generator 320 of FIG. 3. The appropriate transformation to create may be determined automatically, by receiving user input, or a combination of both. In particular, a particular object may have already been determined to have an abnormal characteristic by an object selector, such as object selector 322 of FIG. 3. Moreover, the region that the transformation may need to be applied to may also have been automatically determined by the object selector. Accordingly, based upon the abnormality and the region automatically detected a corresponding transformation may be selected and then created. For example, an object may have already been determined exhibit perspective distortion. In such a case, a sizing transformation may be created, such as a fisheye transformation.

The appropriate transformation to create may also be determined by user input. In particular, a user may have defined a region containing an object having an abnormal characteristic using an input device such as user input device 312 of FIG. 3. The user may then be presented with a display in a GUI asking which type of transformation should be applied to that region. The user may then select from a plurality of transformations, the appropriate transformation. In an exemplary embodiment, the dialog may also provide suggested transformations based upon a detected abnormality. The dialog may also be further configured to provide a preview of each object after the transformation has been applied.

A variety of transformations may be created, including but not limited to, a fish eye transformation, a luminescence transformation, and a scaling transformation. The particular transformation that may be created depends on the particular abnormality occurring in an object. For example, in the case of perspective distortion, a fish eye transformation may be created and then applied to the affected object. A fish eye transformation, when applied to an image, may cause the image to be more enlarged at the center of the part of the image where transformation is applied, and then gradually less enlarged as the transformation moves away from that center point. In the case of abnormal brightness, luminescence transformation may be created. A luminescence transformation, when applied to an image, may adjust the brightness of the image.

The transformation itself may be represented by a mathematical formula or matrix. The transformation may also be further limited to a particular area, such as the region selected within the video stream. Accordingly, while the matrix or function may be applied to an entire frame of video stream, the transformation may only occur within a particular part of the frame, such as within the boundary of an object.

At block 540, the transformation may be applied to the video stream to create a transformed video stream. The transformation may be applied by a transformation module, such as transformation module 318 of FIG. 3, to create transformed video stream 332. The transformation may be applied either to the video stream transmitted from a video conferencing device or the video stream received by the video conferencing device. The transformation may be applied on a frame by frame basis within the video stream.

In some cases, the abnormal object may remain in a relatively static position throughout the video conference, thus the transformation may remain effective throughout the video conference and may be applied statically to the video stream. However, in other cases, the abnormal object may be moving or even slightly moving, thereby causing a transformation applied statically to not remain effective throughout the conference call. In an exemplary embodiment, the user when selecting the boundaries of the abnormal object, may account for this by making the boundaries large enough to account for movements of the particular object. This may permit the transformation to still be applied statically.

In an exemplary embodiment, an abnormal object may be automatically tracked by a transformation module, such as transformation module 318 of FIG. 3, and the location may be automatically adjusted where the transformation is being applied based upon the movements of the abnormal object. In particular, the object detection techniques described with reference to object selector 322 of FIG. 3 may be used to track the borders of the abnormal object in real time. Accordingly, the transformation may be adjusted, such that it is applied with reference to the borders obtained by the automatic object tracking. This may cause the transformation to be applied dynamically by adjusting the borders of the abnormal object as the abnormal object moves.

In an exemplary embodiment, a transformation may be saved for each user. In particular, as discussed above, a camera, such as camera 304 of FIG. 3, may be configured to pan, tilt, and/or zoom automatically towards a user when the user is speaking. Accordingly, the objects appearing in the video stream may change based upon which user is speaking. For example, the camera may focus in on only one user when that user is speaking, so that only one user may appear in the video stream. The camera may also focus in on a group of users when one of the group of users is speaking. In an exemplary embodiment, a transformation may be created for each user or a group of users. Accordingly, when the camera focuses in on a user or a particular group of users (e.g. because a user is speaking), the corresponding transformation may be applied.

Although the techniques, processes, devices, and systems are described herein in the context of a video conferencing, these techniques, processes, devices, or systems may be used in other imaging contexts. For example, the techniques and systems may be used in video imaging software, digital cameras, digital video cameras, or any other type of device that may capture or encounter images with optical distortions.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A video conferencing device having object equalization comprising:
 a processor;
 a memory;
 an interface configured to receive a video stream having a plurality of objects;
 an object selector configured to select a region surrounding a first object in a plurality of objects in the video stream, wherein the first object has abnormal characteristics when compared to a second object in the plurality of objects;
 a transformation generator configured to:
  create a transformation;
  associate the transformation with the first object; and
 a transformation module configured to:
  determine whether the first object appears in a portion of the video; stream;
  when the first object appears in the portion of the video stream, apply the associated transformation to the video stream to create a transformed video stream, in which the first object appears in a manner more consistent with the second object.

2. The video conferencing device of claim 1, further comprising a microphone.

3. The video conferencing device of claim 1, further comprising a display.

4. The video conferencing device of claim 1, further comprising a camera configured to generate the video stream.

5. The video conferencing device of claim 1, wherein the region is a predetermined number of pixels larger or smaller than the first object.

6. The video conferencing device of claim 1, wherein the object selector is further configured to:
 receive an input, wherein the input defines the region surrounding the first object.

7. The video conferencing device of claim 1, wherein the object selector is further configured to:
 automatically detect the plurality of objects in the video stream;
 determine whether the first object has abnormal characteristics when compared to the second object; and
 define the region surrounding the first object.

8. The video conferencing device of claim 1, wherein the transformation is a fish eye transformation.

9. The video conferencing device of claim 1, wherein the transformation is a luminescence transformation.

10. The video conferencing device of claim 1, wherein the transformation generator is further configured to:

determine a transformation based upon a set of abnormal characteristics exhibited by an object in the plurality of objects; and display a dialog confirming whether to apply the transformation to the object.

11. The video conferencing device of claim 4, wherein the camera is further configured to display the first object when sound is detected from the first object.

12. The device of claim 1, wherein the video stream is received from a remote device.

13. A method for object equalization in a device comprising:

receiving, at a video conferencing device, a video stream having a plurality of objects;

selecting a region surrounding a first object in the plurality of objects in the video stream, wherein the first object has abnormal characteristics when compared to a second object in the plurality of objects;

creating a transformation;

associate the transformation with the first object;

determine whether the first object appears in a portion of the video stream; and when the first object appears in the portion of the video stream, applying the associated transformation to the video stream to create a transformed video stream in which the first object appears in a manner more consistent with the second object.

14. The method of claim 13, wherein selecting the region comprises:

selecting the region in the video stream surrounding the first object, wherein the region is a predetermined number of pixels larger or smaller than the first object.

15. The method of claim 13, wherein selecting the region comprises:

receiving an input, wherein the input defines the region surrounding the first object.

16. The method of claim 13, wherein selecting the region comprises:

automatically detecting the plurality of objects in the video stream;

determining whether the first object has abnormal characteristics when compared to the second object; and defining the region surrounding the first object.

17. The method of claim 13, wherein the transformation is a fish eye transformation.

18. The method of claim 13, wherein the transformation is a luminescence transformation.

19. The method of claim 16, wherein creating a transformation further comprises:

determining the transformation based upon a set of abnormal characteristics exhibited by the first object; and displaying a dialog confirming whether to apply the transformation to the first object.

20. The method of claim 13, further comprising:

displaying the first object in the video stream when sound is detected originating from the first object.

* * * * *